United States Patent [19]

Avakian et al.

[11] Patent Number: 4,587,272

[45] Date of Patent: May 6, 1986

[54] FOAMABLE POLYCARBONATE COMPOSITIONS, ARTICLES AND METHODS

[75] Inventors: Roger W. Avakian, Pittsfield, Mass.; Ronald E. Jodice, Florence, S.C.

[73] Assignee: General Electric Company, Pittsfield, Mass.

[21] Appl. No.: 656,595

[22] Filed: Oct. 1, 1984

[51] Int. Cl.$^4$ ............................................... C08J 9/10
[52] U.S. Cl. ...................................... 521/86; 521/88; 521/90; 521/138; 521/180; 521/182; 521/908
[58] Field of Search ................. 521/180, 138, 908, 88, 521/86, 90, 182

[56] References Cited

U.S. PATENT DOCUMENTS

| | | |
|---|---|---|
| 3,554,932 | 1/1971 | Overcashier ..................... 521/908 |
| 3,781,233 | 12/1973 | Muller et al. . |
| 3,799,954 | 3/1974 | Cain et al. . |
| 4,097,421 | 6/1978 | Chang . |
| 4,097,425 | 6/1978 | Niznik . |
| 4,174,432 | 11/1979 | Niznik ............................... 521/138 |
| 4,280,005 | 7/1981 | Fox . |
| 4,286,075 | 8/1981 | Robeson et al. . |
| 4,351,911 | 9/1982 | Fox . |

*Primary Examiner*—Morton Foelak
*Attorney, Agent, or Firm*—Hedman, Gibson, Costigan & Hoare

[57] ABSTRACT

A foamable thermoplastic composition comprising in admixture (a) a polycarbonate resin, alone, or with (b) a polyester resin, (c) a minor amount of a foaming agent and (d) a minor amount of a non-fibrous particulate agent comprising an organic polymeric material to nucleate the foam. The composition also contains a surface active agent compound, such as a silicone, a polyglycol ether, a fatty acid derivative or a mixture thereof, to enhance particulate dispersion and to reduce the surface tension.

14 Claims, No Drawings

FOAMABLE POLYCARBONATE COMPOSITIONS, ARTICLES AND METHODS

BACKGROUND OF THE INVENTION

High molecular weight aromatic polycarbonates and blends thereof with linear polyesters are known, and these can include finely divided particulate fillers having a low aspect ratio, such as silica, and polymeric particles, see, e.g., commonly assigned U.S. patent applications Ser. Nos. 553,172, 553,173, and 553,175, filed Nov. 18, 1983, Richard B. Allen.

Also, it is known to add a foaming agent to thermoplastics as disclosed in U.S. Pat. Nos. 3,781,233, 3,799,954, 4,097,421, 4,097,425, 4,280,005, and 4,351,911.

In U.S. Pat. Nos. 4,280,005 and 4,351,911, it is reported that when a foaming agent is added directly to a polyester, highly irregular foaming occurs which results in an inferior product in that the product contains voids and sink marks. The product is also warped. However, when the foaming agent is added to a polyester containing a filler such as fibrous glass, minerals or mixtures thereof in an amount of at least 5 percent, a foamed product is produced having a rigid cellular core within a solid integral skin.

Compositions of polycarbonates have been foamed too, and glass fibers are also used to aid in the formation of gas bubbles which ultimately form cells. Glass fibers do not, however, produce an entirely uniform, void-free structure and the glass fibers produce severe and adverse reduction in impact strength, especially at low temperatures and an unsmooth surface appearance, especially if recent techniques, such as counterpressure foam molding, are used to produce the parts. High impact strengths are important because applications of polycarbonate structural foams have begun to expand beyond the traditional business equipment and computer housings into uses such as automobile load floors, seats, truck battery boxes, and the like, and low temperature impact strength, especially with the latter are critical.

It has now been discovered that structural foams comprising aromatic polycarbonate resins and related resins can be nucleated without the presence of glass fiber to yield foams that are superior in impact strength. Nucleating agents that can be used include but are not limited to particulate organic polymeric impact modifiers, dispersible polytetrafluoroethylene particles, polyphenylene ether particles, and the like. The use of surfactants is also preferred to help bubble formation and to improve nucleating agent dispersion. Surfactants which can be used include but are not limited to silicones, polyglycol ethers, fluorocarbons, fatty acid derivatives, and the like.

The compositions of the instant invention can be molded, for example, in standard injection molding machines, to produce a variety of foam molded products having good surface appearance, uniform cell structure, and exceptional impact strength.

SUMMARY OF THE INVENTION

According to the present invention, there are provided foamable thermoplastic compositions substantially free of fibrous fillers, said compositions comprising (a) an aromatic polycarbonate, an aromatic polyester carbonate, an aromatic dihydric phenol sulfone carbonate, or a mixture of any of the foregoing, alone, or in combination with (b) a polyester resin comprising units of an aliphatic diol, a cycloaliphatic diol, or a mixture of said diols and an aromatic diacid or a cycloaliphatic diacid, (c) a minor effective amount of a foaming agent; and (d) a minor effective amount of a non-fibrous particulate foam nucleating agent substantially insoluble in the composition and comprising an organic polymeric material, the amounts of (c) and (d) being sufficient to provide a rigid, substantially void-free, substantially uniform cellular core within a solid integral skin.

In preferred features of the invention component (a) comprises from about 99.97 to about 58.0 parts by weight; component (b) comprises from about 0 to about 40 parts by weight; component (c) comprises from about 0.02 to about 2.0 parts by weight; and component (d) comprises from about 0.01 to about 40 parts by weight, based upon the total weight of components (a), (b), (c) and (d) combined.

The thermoplastic compositions of the present invention may also include pigments, such as carbon black, resin additives, flow promoters and the like, as well as flame retardant agents.

DETAILED DESCRIPTION OF THE INVENTION

With respect to component (a), this can comprise an aromatic polycarbonate resin, which can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

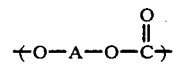

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane; 4,4'-dihydroxydiphenyl ether, bis(2-hydroxyphenyl)methane, mixtures thereof and the like. The preferred aromatic carbonate polymer for component (a) is a homopolymer derived from 2,2-bis(4-hydroxy-phenyl)propane (bisphenol-A).

Poly(ester-carbonates) for use in the invention are known and can be obtained commercially. Generally, they are copolyesters comprising recurring carbonate groups:

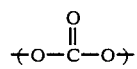

carboxylate groups:

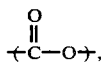

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid; isophthalic acid, terephthalic acid, homophthalic acid, o-, m-, and p-phenylenediacetic acid, 1,4-naphthalic acid, mixtures of any of the foregoing, and the like, with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl di-chloride, isophthaloyl dichloride, or a mixture thereof, and phosgene. The molar proportions of dihydroxy diaryl units to benzenedicarboxylate units to carbonate units can range from 1:0.2–1.00:0.80–0.00 and the molar range of terephthalate units to isophthalate units can range from 99:1 to 1:99 in this preferred family of resins. When the molar proportion of carbonate units is 0, the resin is a wholly aromatic polyester. Se Robeson, U.S. Pat. No. 4,286,075.

The aromatic dihydric phenol sulfone resins used in component (a) are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis-(3,5-dimethyl-4-hydroxy phenyl)sulfone, alone, or especially in combination with bisphenol A with a phosgene or a phosgene precursor, in accordance with the description in Fox, U.S. Pat. No. 3,737,409. Especially preferred is a copolymer made by reacting 1–99, preferably 40–99 wt percent of the sulfone, 99 to 1, preferably 1 to 60 wt percent of the bisphenol with phosgene.

With respect to component (b), polyesters suitable for use herein are derived from an aliphatic or cycloaliphatic diol, or mixtures thereof, containing from about 2 to about 10 carbon atoms and at least one aromatic dicarboxylic acid. Preferred polyesters are derived from an aliphatic diol and an aromatic dicarboxylic acid have repeated untis of the following general formula:

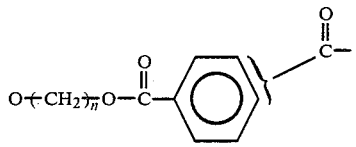

wherein n is an integer of from 2 to 4. The most preferred polyester is poly(ethylene terephthalate).

Also contemplated herein are the above polyesters with additional amounts of polyols and/or acids in the amounts of from 0.5 to 50 wt. percent based on the total composition. The acids can be aliphatic or cycloaliphatic with the number of carbon atoms ranging from 2 to 20. Likewise, the glycols can be cycloaliphatic or aliphatic with the number of carbon atoms covering the same range. Polyalkylene ether glycols can also be used where the alkylene portion has from 2 to 10 carbon atoms and the entire glycol portion varies in molecular weight from 100 to 10,000. All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

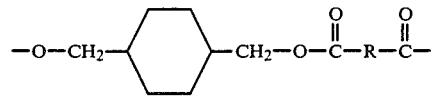

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated reside R are isophthalic or terephthalic acid, 1,2-di(p-carboxyphenyl)ethane, 4,4′-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

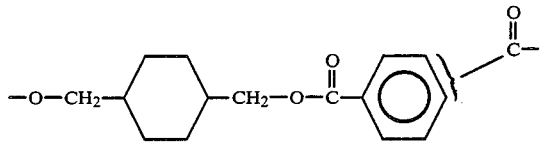

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane-dimethanol and an alkylene glycol with an aromatic dicarboxylic acid so as to produce a copolyester having units of the following formula:

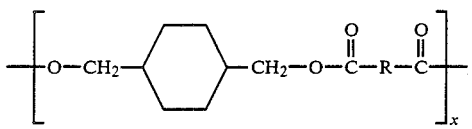

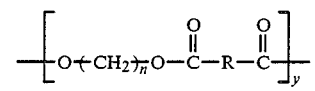

wherein the cyclohexane ring is selected from the cis- and trans-isomers thereof, R is as previously defined, n is an integer of 2 to 10, the x units comprise from about 1 to about 99 percent by weight and the y units comprise from about 99 to about 1 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 80:20:100. These copolyesters have repeating units of the following formula:

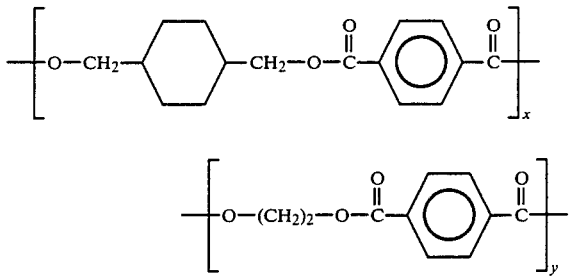

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl./g. as measured in a 60:40 phenol/tetrachloethane mixture or similar solvent at 23°–30° C.

For those embodiments of the invention having flame retardant properties, conventional additives can be used in conventional amounts. For example, sulfonate salts in small amounts can be used, such as a sulfonate salt, e.g., potassium benzenesulfonic acid at least 0.1, and preferably 0.4 parts per hundred by weight of polycarbonate, or aromatic halogen compounds, such as tetrabromobisphenol A homopolymers or copolymers or oligomers, alone, or with a suitable synergist, such as antimony oxide, can be used in effective amounts to provide flame resistance, e.g., about 2–12 parts by weight of bromine per 100 parts by weight of flammable resin content.

The foaming agents (c) of the present invention can be selected from chemicals containing decomposable groups such as azo, N-nitroso, carboxylate, carbonate, heterocyclic nitrogen containing and sulfonyl hydrazide groups. Generally, they are solid materials that liberate gas(es) when heated by means of a chemical reaction or decomposition. Representative compounds include azodicarbonamide, dinitrosopentamethylene tetramethylene tetramine, p,p'-oxy-bis(benzenesulfonyl)-hydrazide, benzene-1,3-disulfonyl hydrazide, azo-bis-(-isobutyronitrile), biuret and urea. The dihydrooxadiazinones of U.S. Pat. No. 4,097,425 are members of an especially preferred family of foaming agents. The foaming agent may be added to the polymer in several different ways which are known to those skilled in the art, for example, by adding the solid powder, liquid or gaseous agents directly to the resin in the extruder while the resin is in the molten state to obtain uniform dispersal of the agent in the molten plastic. The temperature and pressures to which the foamable composition of the invention are subjected to provide a foamed polyester/polycarbonate composition will vary within a wide range, depending upon the amount and type of foaming agent that is used. The foaming agents may be used in amounts of from about 0.01 to about 2.5 parts by weight and preferably from about 0.02 to 2.0 parts by weight per 100 parts by weight of the toal composition (resin). The preferred foaming agents are dinitrosopentamethylene tetramine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one and mixtures of any of them.

The purpose of foam nucleating agent (d) is to provide a surface for bubble formation. This is analogous to the use of "boiling chips" to moderate bubble formation and to prevent "bumping" in boiling liquids. Numerous attempts to form foams from the same resins (a), alone, or with (b), without nucleating agent were unsuccessful. Although glass fibers are better than nothing, they ruin impact properties, as will be seen. The retention of impact properties requires judicious selection of particle size, shape, and surface polarity, but the most important characteristic appears to be the need to avoid fibrous characteristics. Fibrous materials, such as glass, result in very poor impact strengths, especially at low temperatures, e.g., $-40°$ C. As has been mentioned before, also, fibrous fillers, e.g., glass fibers, will show up as surface imperfections, especially if counterpressure molding is used, but non-fibrous foam nucleating agents, especially in sub-micron sizes, do not detract from surface smoothness.

Although numerous compounds can be employed for use as foam nucleating agents according to this invention, their selection by those skilled in this art is a simple matter. The compositions can be formulated and foam molded in standard injection molding machines into workpieces suitable for measuring cell structure and flow and ultimately unnotched Izod impact strength. The best formulations can then, if desired, be scaled up for molding into panels and then tested for drop ball impact strength, which provides useful information on resistance to brittle impact failure. The latter test is the most sensitive to fine formulation changes and has the added advantage of being closest to actual end use requirements.

As has been mentioned, it has been discovered that satisfactory results are achievable with organic polymeric particulates, illustratively, particulate impact modifiers, such as the acrylate copolymers described in U.S. Pat. No. 4,320,212, Liu, dispersible polytetrafluoroethylene particles, polyphenylene ether polymers, and the like.

In the present invention, it is preferred to use an acrylate impact modifier as component (d). These are readily available in a variety of forms with suitable particle sizes, and in non-fibrous forms.

The preferred acrylate polymers are acrylate-based core-shell multi-phase composite interpolymer resins. More particularly, the acrylate-based core-shell multiphase composite interpolymer resin is a core-shell interpolymer comprising about 25 to 95 percent by weight of a first elastomeric phase and about 75 to 5 percent by weight of a final rigid thermoplastic shell phase. One or more intermediate phases are optional, for example, a middle stage polymerized from about 75 to 100 percent by weight styrene.

The first stage or core of multiphase composite interpolymer component is polymerized from about 75 to 99.8 weight percent $C_1$ to $C_6$ alkyl acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and poly methacrylic esters of polyols such as butylene diacrylate and dimethacrylate, trimethylol propane trimethacrylate, and the like, di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizes at substantially different rate of polymerization from at least one other of said reactive groups. The function of the graftlinking monomer is to provide a residual level of unsaturation is the elastomeric phase, particularly in the latter stages of polymerization, and consequently, at or near the surface of the elastomer particles. When the rigid thermoplastic shell phase is subsequently polymerized at the surface of the elastomer, the residual unsaturated, addition-polymerizable reactive groups contributed by the graft-linking monomer participates in the subsequent reaction so that at least a portion of the rigid shell phase is chemically attached to the surface of the elastomer.

Among the effective graftlinking monomers are allyl group-containing monomers of allyl esters of ethylenically unsaturated acids, such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 weight percent of n-butyl acrylate, 0-2.5 weight percent of butylene diacrylate as crosslinking agent, 0.1 to 2.5 percent by weight allyl methacrylate or diallyl maleate as graftlinking agent with a final stage polymerized from about 60 to 100 percent by weight methyl methacrylate. A preferred two stage interpolymer of this type is commercially available under the tradename, ACRYLOID ®KM 330, from Rohm & Haas Chemical Company.

The final or shell stage monomer system can be comprised of $C_1$ or $C_{16}$ methacrylate, styrene, acrylonitrile, alkyl acrylates, allyl methacrylate, diallyl methacrylate, and the like, as long as the overall $T_g$ system is at least 20° C. Preferably, the final stage monomer system is at least 50 weight percent $C_1$ to $C_4$ alkyl methacrylate. It is further preferred that the final stage polymer be free of units which tend to degrade poly(alkylene terephthalates), for example, acid, hydroxyl, amino, and amide groups.

The multiphase composite interpolymers are prepared sequentially by emulsion polymerization techniques wherein each successive outer stage coats the previous stage polymer. By way of illustration, the monomeric $C_1$–$C_6$ acrylate, the cross-linking monomer and the graft-linking monomer are copolymerized in water in the presence of a free-radical generating catalyst and a polymerization regulator which serves as a chain transfer agent, at a temperature on the order of from 15° C. to 80° C. The first elastomeric phase is formed in situ to provide a latex of the core copolymer.

Thereafter, the second rigid thermoplastic phase monomers are added and are emulsion polymerized with core-copolymer latex to form the interpolymers. A more detailed description of the preparation of the acrylate-based interpolymers for use herein can be found in U.S. Pat. No. 4,034,013 and 4,096,202, both being specifically incorporated herein by reference.

Preferred polyphenylene ether resins are homopolymers or copolymers having units of the formula

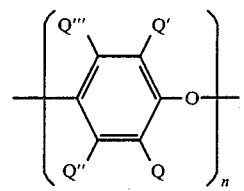

in which Q, Q', Q" and Q'" are, independently, selected from teh group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

The polyphenylene ether resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene)ether; poly(2,6-dimethoxyl-1,4-phenylene)ether; poly(2,6-diethoxy-1,4-phenylene)ether; poly(2,methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,36-trimethylphenol or 2-methyl-6-butylphenol, to produce the corresponding copolymer, for example, poly(2,6-dimethyl-co-2,3,6-trimethylphenol), poly(2,6-dimethyl-co-2-methyl-6-butylphenol), and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

In other embodiments, agents for helping particulate dispersion and to reduce surface tension will be included. These generally will be non-ionic surfactants, and will typically be, for example, silicones, polyglycol ethers, fluorocarbons, fatty acid derivatives, and many others. Amounts of from 0.01 to about 5.0 parts by weight per 100 parts by weight of the composition will be used.

In some embodiments, the compositions of the present invention will include (e) a modifier to increase the flow of resin during molding. Many materials are suitable for this purpose, but special mention is made of paraffin waxes, fatty acid esters, polyethylene waxes or mixtures. Suitable commercially available materials will be illustrated in the examples, and they can be used in a wide concentration range, preferably 0.1 to 5 parts by weight per 100 parts by weight of total composition.

In other embodiments, the compositions of the present invention can include an effective amount of (f) a modifier to increase the impact strength of the composition. These can comprise organic polymeric materials generally used to enhance the impact strength of thermoplastics. Typically, they can be a block copolymer of butadiene and styrene, a block copolymer of polycarbonate and polysiloxane, core-shell polymers and copolymers of acrylates and acrylic rubbers, linear low density polyolefins, and the like. Preferably such modifiers comprise acrylic rubbers or silicone polymers, and they will be used in conventional amounts, e.g., from 1 to 20 parts by weight, preferably from 2 to 10 parts by weight, per 100 parts of total composition.

The relative amounts of components used in the method of the present invention can vary widely. For example, the aromatic carbonate polymer component (a) can comprise from 100 to 1 parts by weight of polyester resin component (b) can comprise correspondingly from 0 to 99 parts by weight. Effective amounts of the other additives have been discussed above. In any event, one will use the lowest amount to obtain the desired result, since there is the least tendency to adversely affect physical properties in so-doing.

The resins and other ingredients may be prepared by any of the well known methods outlined above. They may be blended with one another at room temperature. The blend consisting of polycarbonate, any optional resin, the foam nucleating agent, any impact modifier, etc., are fed into an extruder at a temperature of 480° F. to about 550° F. The extrudate is then comminuted into pellets or other suitable shapes. The decomposable chemical foaming agent can be dry tumbled with the resin blend, or it can previously have been added, e.g., as a concentrate in polycarbonate resin. This mixture is then fed into a conventional molding machine. The modling temperature may be from about 500° F. to about 580° F. with the mold temperature being from about 100° F. to 250° F., preferably from about 140° F. to about 200° F.

The foamable composition may be handled in any conventional manner employed for the fabrication or manipulation of thermoplastics such as low and high pressure injection molding to provide thermoplastic products which have uniform cell structure, smooth surfaces, high impact, modulus and tensile strength, improved flow and cycle time.

The compositions may contain additional materials such as pigments and dyes, stabilizers, antioxidants, mold-release agents, ultraviolet stabilizers, and the like.

DESCRIPTION OF THE PREFERRED EMBODIMENTS

The following examples are set forth herein to illustrate in more detail the preferred embodiments and to illustrate more clearly the principle and practice of this invention to those skilled in the art. Unless otherwise specified, where parts or percents are mentioned, they are parts or percents by weight.

Formulations were compounded by dry blending the components followed by extrusion on a vented, one inch single screw Haake Buchler extruder with a length/diameter ratio of 25. Generally, the polycarbonate powder was not dried prior to extrusion. The extrusion parameters were as follows:

|  | Extrusion Conditions | |
|---|---|---|
|  | Actual | Set |
| Zone 1 | 285° C. | 285° C. |
| Zone 2 | 290° C. | 290° C. |
| Zone 3 | 295° C. | 295° C. |
| Die | 295° C. | 295° C. |
| Melt | 296° C. |  |
| Pressure | 350 psi |  |
| RPM | 50–150 |  |
| Amps | 20 |  |

Prior to molding, the compounded resin was dry blended with the blowing agent at a 5/95 blowing agent resin concentrate/polycarbonate resin ratio. The dry blend was further dried at 110° C. for 4 hours prior to molding. After drying, the material was foam molded to a density of 0.90 g./cc. into Izod impact bars (5"×½"×½") and drop ball impact plaques (5½"×11"×¼"). Molding was done in a 10½ oz. Reed molding press utilizing about 15% and about 80% of shot capacity for Izod bars and plaques respectively. Molding parameters were as follows:

| Molding Conditions | |
|---|---|
| Nozzle Temp., °F. | 550 |
| Front Temp., °F. | 580 |
| Center Temp., °F. | 580 |
| Rear Temp., °F. | 480 |
| Mold Temp., °F. | 180 |
| Injection: Hold | 100 psi |
| Std. | 0 psi |
| Fast | 700 psi |
| Cure Time | 55 sec. |
| Clamp Open | 1.0 sec. |
| Cycle Time | 62 sec. |
| Shot Time | 0.5–1.0 sec. |
| Amt. Blowing Agent | 5% by weight |

For testing, the procedure of American Society of Testing Materials (ASTM D-256) was used on unnotched Izod bars. Drop ball impact testing was done according to ASTM D-2444, slightly modified. Particle size and surface area measurements on the nucleating agents were obtained from the suppliers thereof, or by optical microscopy when not so available.

EXAMPLES 1-3

Compositions comprising an aromatic polycarbonate resin (General Electric Company, LEXAN 100), a chemical blowing agent and various organic polymers in particulate form were formulated, foam molded and tested. The formulations used and the results obtained are set forth in Table 1.

TABLE 1

Foamed Compositions of Polycarbonate and Polymeric Materials

| Example | 1 | 2 | 3 |
|---|---|---|---|
| Composition (parts by weight) | | | |
| Poly(bisphenol-A carbonate) | 100 | 100 | 100 |
| 5-phenyl-3,6-dihydro-1,3,4-oxadiazin-2-one blowing agent | — | — | — |
| Polytetrafluoroethylene powder | 0.5 | — | — |
| Core/shell acrylic rubber powder[a] | — | 0.5 | — |
| Poly(2,6-dimethyl-1,4-phenylene) ether powder[b] | — | — | 0.5 |
| Properties | | | |
| Unnotched Izod Impact, ft.-lbs., 25° C. | 14.3 | — | — |
| Drop ball impact, ft. lbs. | — | 5NB | 5NB |
| 25° C. | 90 | 9.3 | 68 |
| −40° C. | 23 | Not Tested | 24 |

[a]Rohm & Haas Co., ACRYLOID KM 330, N 0.5 microns.
[b]General Electric Co., 20 microns particle size.

Impact resistant foams according to this invention are obtained. Some voids were seen in Examples 2 and 3. Compositions without added nucleating agents (i.e., without powders a–c) could not be molded into structurally sound skin core foams.

EXAMPLE 4

A composition containing 22 parts by weight of poly(ethylene terephthalate), 72 parts by weight of poly(bisphenol-A carbonate), 3 parts by weight of a copolymer of ethylene and ethyl acrylate (Union Carbide's DPD 6169), and 3 parts by weight of an acrylate/methacrylate core-shell polymer (Rohm & Haas' ACRYLOID KM 330) was prepared by blending at room temperature. The blend was fed to an extruder at a temperature of about 550° F. The extrudate was formed into pellets. The pellets were dried at 250° F. for about 4 hours, then tumble blended with 0.5 part by weight of 5-phenyl-3,6-dihydro-1,3,4-oxadiazin-2-one foaming agent. The resulting composition was injection molded at 530° F. into standard ASTM test pieces having a specific gravity of 0.90. The results were as follows:

TABLE 2

| Physical Properties | 4 |
|---|---|
| Unnotched Izod impact strength, ft. lb./in. | 13.9 |
| Falling dart impact strength (on 5½" × 0.250" × 11" panel), st. lbs. | 55 |

The test bars comprised foam of good surface appearance, uniform cell structure, and good impact strength.

The foregoing patents, applications, and publications are incorporated herein by reference. Many variations will suggest themselves to those skilled in this art in light of the above, detailed description. For example, the polycarbonate can be replaced in part by poly(ethylene terephthalate), poly(1,4-butylene terephthalate) poly(1,4-cyclohexyldimethylene)terephthalate, and the like. The blowing agent 5-phenyl-3,6-dihydro-1,3,4-oxadiazinedione can be replaced with 5-phenyl tetrazole. All such obvious variations are within the full intended scope of the appended claims.

We claim:

1. A foamable thermoplastic composition substantially free of fibrous fillers, said composition comprising
   (a) an aromatic polycarbonate, an aromatic polyester carbonate, an aromatic dihydric sulfone carbonate, or a mixture of any of the foregoing, in combination with
   (b) a polyester resin comprising units of an aliphatic diol, a cycloaliphatic diol, or a mixture of said diols and an aromatic diacid or a cycloaliphatic diacid,
   (c) a minor effective amount of a foaming agent; and
   (d) from about 0.1 to about 5.0 parts by weight of a non-fibrous particulate foam nucleating agent substantially insoluble in the composition and consisting of a particulate acrylate polymer, the amounts of (c) and (d) being sufficient to provide a rigid substantially void-free, substantially uniform cellular core within a solid integral skin, said composition also including a surface active agent compound comprising a silicone, a polyglycol ether, a fatty acid derivative or a mixture of any of the foregoing in an amount sufficient to help particulate dispersion and to reduce surface tension.

2. A composition as defined in claim 1 wherein said foaming agent (c) is present in an amount of from about 0.02 to about 2.0 parts by weight based on the 100 parts by weight of the total composition.

3. A composition as defined in claim 1 wherein said foam nucleating agent (d) is present in an amount of from about 0.01 to about 40 parts by weight per 100 parts by weight of the total composition.

4. A composition as defined in claim 1 which also includes (e) an effective amount of a modifier to increase the flow of the composition during molding.

5. A composition as defined in claim 4 wherein said modifier (e) is selected from waxes, fatty acid esters, polyethylene waxes or a mixture of any of the foregoing.

6. A composition as defined in claim 1 wherein component (a) comprises an aromatic polycarbonate.

7. A composition as defined in claim 6 wherein component (a) comprises poly(bisphenol-A) carbonate.

8. A composition as defined in claim 7, wherein component (b) comprises poly(ethylene terephthalate).

9. A composition as defined in claim 1 wherein component (c) comprises a chemical compound which can be decomposed to release a gas harmless to resin components (a) and (b).

10. A composition as defined in claim 9 wherein component (c) comprises a nitroso compound, a semicarbazide compound, a tetrazole compound, an oxalate compound, a triazine compound, a dihydrooxadiazinone compound, or a mixture of any of the foregoing.

11. A composition as defined in claim 10 wherein component (c) comprises 5-phenyl-3,6-dihydro-1,3,4-oxadiazin-2-one.

12. A foamable thermoplastic composition substantially free of fibrous fillers, said composition comprising
   (a) poly(bisphenol-A carbonate), in combination with
   (b) poly(ethylene terephthalate),
   (c) from about 0.02 to about 2.0 parts by weight of a dihydrooxadiazinone foaming agent, and
   (d) from about 0.1 to about 5.0 parts by weight of a non-fibrous particulate foam nucleating agent consisting of a particulate acrylate polymer, the parts by weight being based on 100 parts by weight total of (a), (b), (c) and (d), said composition also including a surface active agent compound comprising a silicone, a polyglycol ether, a fatty acid derivative or a mixture of any of the foregoing in an amount sufficient to help particulate dispersion and to reduce surface tension.

13. A method of preparing foamed thermoplastic compositions comprising
  A. combining in the substantial absence of fibrous fillers, a composition comprising
    (a) an aromatic polycarbonate, an aromatic polyester carbonate, an aromatic dihydric phenol sulfone carbonate, or a mixture of any of the foregoing, in combination with
    (b) a polyester resin comprising units of an aliphatic diol, a cycloaliphatic diol or a mixture of said diols and an aromatic diacid or a cycloaliphatic diacid,
    (c) a minor effective amount of a foaming agent, and
    (d) from about 0.1 to about 5.0 parts by weight of a non-fibrous particulate foam nucleating agent substantially insoluble in the composition consisting of a particulate acrylate polymer, said composition also including a surface active agent comprising a silicone, a polyglycol ether, a fatty acid derivative or a mixture of any of the foregoing in an amount sufficient to help particulate dispersion and to reduce surface tension, and
  B. heating said composition in a confined space above a temperature at which polymer components (a) and (b) soften and foaming agent (c) decomposes to release a gas, until formation of a rigid substantially uniform cellular structure is complete.

14. A method of preparing foamed thermoplastic compositions comprising:
  A. combining in the substantial absence of fillers having an aspect ratio of greater than about 1.0, a composition comprising
    (a) poly(bisphenol-A carbonate), in combination with
    (b) poly(ethylene terephthalate),
    (c) from about 0.02 to about 2.0 parts by weight of a dihydrooxadiazinone foaming agent, and
    (d) from about 0.1 to 5.0 parts by weight of a non-fibrous particulate foam nucleating agent consisting of a particulate acrylate polymer, said composition also including a surface active agent compound comprising a silicone, a polyglycol ether, a fatty acid derivative or a mixture of any of the foregoing in an amount sufficient to help particulate dispersion and to reduce surface tension, said amount being from 0.01 to about 5.0 parts by weight, the parts by weight being based on 100 parts by weight total of (a), (b), (c) and (d), and
  B. heating said composition in a confined space above a temperature at which polymer components (a) and (b) soften and foaming agent (c) decomposes to release a gas, until formation of a rigid substantially uniform cellular structure is complete.

* * * * *